United States Patent
Yadav et al.

(10) Patent No.: US 12,183,876 B2
(45) Date of Patent: Dec. 31, 2024

(54) HIGH-VOLTAGE ION-MEDIATED FLOW/FLOW-ASSIST MANGANESE DIOXIDE-ZINC BATTERY

(71) Applicant: RESEARCH FOUNDATION OF THE CITY UNIVERSITY OF NEW YORK, New York, NY (US)

(72) Inventors: Gautam G. Yadav, New York, NY (US); Jinchao Huang, New York, NY (US); Damon Turney, New York, NY (US); Michael Nyce, New York, NY (US); Alexander Couzis, New York, NY (US); Valerio Deangelis, New York, NY (US); Sanjoy Banerjee, New York, NY (US); Xia Wei, New York, NY (US)

(73) Assignee: RESEARCH FOUNDATION OF THE CITY UNIVERSITY OF NEW YORK, New York, NY (US)

( * ) Notice: Subject to any disclaimer, the term of this patent is extended or adjusted under 35 U.S.C. 154(b) by 273 days.

(21) Appl. No.: 17/251,690

(22) PCT Filed: Jun. 13, 2019

(86) PCT No.: PCT/US2019/037009
§ 371 (c)(1),
(2) Date: Dec. 11, 2020

(87) PCT Pub. No.: WO2019/241531
PCT Pub. Date: Dec. 19, 2019

(65) Prior Publication Data
US 2021/0280899 A1    Sep. 9, 2021

Related U.S. Application Data

(60) Provisional application No. 62/684,923, filed on Jun. 14, 2018.

(51) Int. Cl.
H01M 10/054    (2010.01)
H01M 4/04      (2006.01)
(Continued)

(52) U.S. Cl.
CPC ....... *H01M 10/054* (2013.01); *H01M 4/0404* (2013.01); *H01M 4/663* (2013.01); *H01M 4/74* (2013.01); *H01M 10/0563* (2013.01)

(58) Field of Classification Search
CPC .. H01M 10/054; H01M 10/0561; H01M 6/04; H01M 4/0404; H01M 4/663; H01M 4/74; H01M 8/04186
See application file for complete search history.

(56) References Cited

U.S. PATENT DOCUMENTS

| | | | |
|---|---|---|---|
| 9,640,826 B2 * | 5/2017 | Yan ............ | H01M 8/188 |
| 2003/0099881 A1 * | 5/2003 | Bowden ........ | H01M 6/08 |
| | | | 423/599 |

(Continued)

FOREIGN PATENT DOCUMENTS

| | | |
|---|---|---|
| WO | 2012094674 A2 | 7/2012 |
| WO | 2016104237 A1 | 6/2016 |

(Continued)

OTHER PUBLICATIONS

International Search Report and Written Opinion dated Sep. 16, 2019, for International Application No. PCT/US2019/037009, filed on Jun. 13, 2019.

(Continued)

*Primary Examiner* — Matthew T Martin
*Assistant Examiner* — Ankith R Sripathi
(74) *Attorney, Agent, or Firm* — Andrew M. Metrailer; Conley Rose, P.C.

(57) ABSTRACT

A battery includes a cathode compartment, a catholyte solution disposed within the cathode compartment, an anode compartment, an anolyte solution disposed within the anode compartment, a separator disposed between the cathode compartment and the anode compartment, and a flow system configured to provide fluid circulation in the cathode compartment and the anode compartment. The catholyte solution and the anolyte solution have different compositions.

22 Claims, 4 Drawing Sheets

(51) Int. Cl.
   *H01M 4/66* (2006.01)
   *H01M 4/74* (2006.01)
   *H01M 10/0563* (2010.01)

(56) References Cited

U.S. PATENT DOCUMENTS

| | | | |
|---|---|---|---|
| 2012/0045680 A1* | 2/2012 | Dong | H01M 8/04186 |
| | | | 429/105 |
| 2014/0227574 A1 | 8/2014 | Savinell et al. | |
| 2015/0311516 A1 | 10/2015 | Chen et al. | |
| 2017/0025698 A1 | 1/2017 | Shishikura et al. | |
| 2018/0104921 A1* | 4/2018 | Beyad | H01M 4/50 |
| 2018/0166665 A1* | 6/2018 | Audebert | H01M 50/116 |
| 2019/0115613 A1* | 4/2019 | Manthiram | H01M 4/0404 |

FOREIGN PATENT DOCUMENTS

| | | | |
|---|---|---|---|
| WO | 2017075577 A1 | 5/2017 | |
| WO | 2019241531 A1 | 12/2019 | |

OTHER PUBLICATIONS

Pan, et al., "Reversible aqueous zinc/manganese oxide energy storage from conversion reactions". Nature Energy vol. 1, Article No. 16039 (2016). Apr. 18, 2016; entire document; especially p. 2; [online] URL https://www.nature.com/articles/nenergy201639.

Xu, et al., "Energetic Zinc Ion Chemistry: The Rechargeable Zinc Ion Battery," Andgewandte Chemie, vol. 51, Issue 4, Jan. 23, 2012, pp. 933-935; entire document; especially Fig. 1, p. 933; [online] URL https://onlinelibrary.wiley.com/doi/abs/10.1002/anie.201106307.

Yadav, et al., "Regenerable Cu-inlercalated MnO2 layered cathode for highly cyclable energy dense batteries". Nature Communications vol. 8, Article No. 14424 {2017}. Mar. 6, 2017; entire document; especially p. 2, 8; (online] URL https://www.nature.com/articles/ncomms14424.

International Preliminary Report on Patentability dated Dec. 24, 2020 for International Application No. PCT/US2019/037009, filed on Jun. 13, 2019.

* cited by examiner

HIGH-VOLTAGE ION-MEDIATED FLOW/FLOW-ASSIST MANGANESE DIOXIDE-ZINC BATTERY

CROSS-REFERENCE TO RELATED APPLICATIONS

This application is a filing under 35 U.S.C. 371 as the National Stage of International Application No. PCT/US2019/037009, filed on Jun. 13, 2019 and entitled, "A HIGH-VOLTAGE ION-MEDIATED FLOW/FLOW-ASSIST MANGANESE DIOXIDE-ZINC BATTERY," which claims the benefit of and claims priority to U.S. Provisional Application No. 62/684,923 filed on Jun. 14, 2018, and entitled "A HIGH-VOLTAGE ION-MEDIATED FLOW/FLOW-ASSIST MANGANESE DIOXIDE-ZINC BATTERY," both of which are incorporated herein by reference in their entirety for all purposes.

BACKGROUND

This disclosure relates to batteries including electrochemical cells. Alkaline manganese dioxide cells have been predominantly used as primary batteries. However, the one-time use of primary batteries results in large material wastage as well as undesirable environmental consequences. Also, potential economic losses can arise due to the significant imbalance between the energy that is required to manufacture these cells compared to the energy that can be actually stored. As a consequence, there is a clear advantage to provide rechargeable or secondary cells.

SUMMARY

In an embodiment, a battery comprises a cathode compartment, a catholyte solution disposed within the cathode compartment, an anode compartment, an anolyte solution disposed within the anode compartment, a separator disposed between the cathode compartment and the anode compartment, and a flow system configured to provide fluid circulation in the cathode compartment and the anode compartment. The catholyte solution and the anolyte solution have different compositions.

In an embodiment, a method of operating a battery comprises circulating a catholyte solution within a cathode compartment of a battery, circulating an anolyte solution within an node compartment of the battery, preventing direct mixing between the anolyte and the catholyte during the circulating by using a separator disposed between the cathode compartment and the anode compartment, and generating an electrical current from the battery while circulating the catholyte solution and circulating the anolyte solution. The catholyte solution comprises manganese ions, and the anolyte solution comprises zinc ions. The catholyte solution and the anolyte solution have different compositions.

The foregoing has outlined rather broadly the features and technical advantages of the present invention in order that the detailed description of the invention that follows may be better understood. Additional features and advantages of the invention will be described hereinafter that form the subject of the claims of the invention. It should be appreciated by those skilled in the art that the conception and the specific embodiments disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the present disclosure and the advantages thereof, reference is now made to the following brief description, taken in connection with the accompanying drawings and detailed description, wherein like reference numerals represent like parts.

DETAILED DESCRIPTION

Figure 1A:
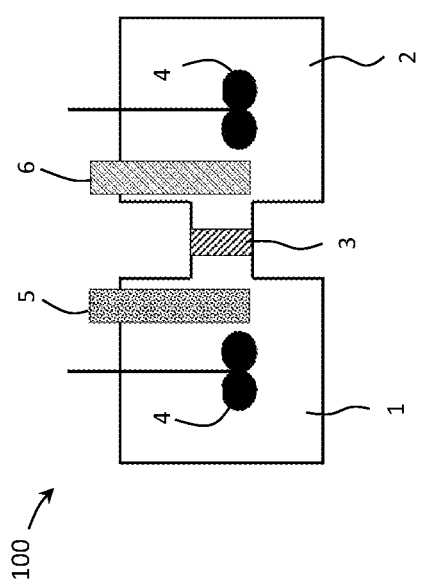
FIG. 1A illustrates a schematic drawing of a flow battery according to an embodiment.

In this disclosure, the terms "negative electrode" and "anode" are both used to mean "negative electrode." Likewise, the terms "positive electrode" and "cathode" are both used to mean "positive electrode." Reference to an "electrode" alone can refer to the anode, cathode, or both. Reference to a "catholyte" refers to an electrolyte in contact with the cathode alone, and reference to an "anolyte" refers to an electrolyte in contact with the anode alone. Reference to an electrolyte can refer to a more general electrolyte, the catholyte, the anolyte, or any combination thereof.

This disclosure relates to methods of assembling and/or manufacturing flow/flow-assisted batteries. As a type of secondary batteries, flow-assisted batteries use an electrolyte solution that is circulated around the electrodes (e.g., anode, cathode), and the circulation of the electrolyte solution may provide a means for discharging and recharging the battery. In most flow-assisted battery configurations, the electrolyte is circulated through the battery and contacts both the anode and the cathode. As a result, the electrolyte composition contacting both the anode(s) and cathode(s) has the same composition. This limits the ability to tailor the electrolyte composition to the chemistry of the anode and cathode.

Disclosed herein is a novel battery having attributes of low cost, high safety and high energy density. The battery uses flow or flow-assist manganese dioxide-zinc electrodes. The manganese dioxide and zinc can be plated simultaneously from catholyte and anolyte solutions, respectively, that may have different compositions and properties (e.g., different pHs, chemical makeup, etc.) to produce a battery with voltages nearing 2.5V using aqueous electrolyte(s). The catholyte and anolyte solutions are separated with the help of a separator membrane that can transfer a charge and/or a common ion between the two fluids. During the charging process, the battery produces solid manganese dioxide on the cathode and solid zinc metal on the anode from manganese and zinc ion containing solutions, respectively, while during the discharge process these solids dissolve into the aqueous solution to their respective ions. The ability to use different electrolytes for each electrode allows for improved performance that is not achievable when a single common electrolyte is used within a battery. The systems disclosed herein are the first demonstration of a high-voltage manganese dioxide-zinc aqueous battery with either a flow or flow-assist configuration.

Without wishing to be limited by theory, the two electrodes (i.e., a Zn anode and a manganese dioxide cathode) that are part of the battery have different electrochemical potentials which are dictated by the chemistry that occurs at each electrode. When such electrodes are connected to an external device, electrons flow from the more negative to the more positive potential electrode and electrical energy can be extracted by the external device/circuit. The charge balance in a battery can be maintained by the transport of ions through an ion transporter, such as for example the anolyte, the separator, and the catholyte.

FIG. 1A illustrates a multi-chamber design of a battery. As shown, the battery 100 can comprise a housing 40 configured to form a multi-chamber design having a cathode compartment 1 with a cathode current collector 5 and a catholyte disposed within the cathode compartment 1. An anode compartment 2 can have an anode current collector 6 and an anolyte disposed within the anode compartment 2. A separator 3 can be disposed between the cathode compartment 1 and the anode compartment 2 to provide a seal to bulk fluid migration between the two compartments. Each compartment can comprise a mixing device 4 configured to induce a flow to circulate the respective electrolyte within each compartment. While shown as two compartments, three or more compartments can also be present with a separator disposed between each compartment, and the compartments can alternative between an anode compartment and a cathode compartment.

The housing 40 is configured to contain the electrodes (e.g., one or more Zn anodes, one or more manganese dioxide cathodes) in respective compartments along with the anolyte and catholyte in respective compartments, provide for a flow path for the circulation of the anolyte and catholyte solutions, and provide a seal with the separator 3 to physically separate the anolyte from the catholyte. In some embodiments, the housing 40 comprises a molded box or container that is generally non-reactive with respect to the anolyte and catholyte solutions. In an embodiment, the battery housing comprises a polymeric (e.g., polypropylene, acrylic polymer, etc.) molded container, a polymer coated metal molded container, or another container formed from a non-reactive material.

The separator 3 serves to prevent bulk mixing between the catholyte in the cathode compartment 1 with the anolyte in the anode compartment 2. As such, the separator can form a sealed engagement with the housing 40 to physically separate the anolyte from the catholyte. The separator also serves to form an electrically insulating barrier between the anode compartment 2 and the cathode compartment 1 while being porous to hold the electrolyte and allow for ionic flow and/or selective ionic flow between the anolyte and catholyte. As will be appreciated by one of skill in the art, the separator allows at least a portion and/or component of the anolyte and/or catholyte, to pass (e.g., cross, traverse, etc.) through the separator membrane, to balance ionic flow and sustain the flow of electrons in the battery. This selective flow can be referred to as a selective ionic flow in some contexts.

The separator can comprise one or more layers of a separator material or membrane and/or be present as a membrane in a stack of membranes that collectively form the separator. Various materials can be used to form the separator. Suitable materials can include, but are not limited to, lithium super ionic conductor (LISICON), sodium super ionic conductions (NASICON), Nafion, a bipolar membrane, water electrolysis membrane, a composite of polyvinyl alcohol and graphene oxide, Celgard, cellophane or combinations thereof. In some embodiments, the separator can comprise an ion selective material such as graphene, graphene oxide, reduced graphene oxide, functionalized graphene, or combinations thereof. The graphene can be functionalized with carboxyl, hydroxyl, epoxy oxygen functional groups, or other oxygen containing functional groups. In some embodiments, the graphene can be functionalized with hydrophilic functional groups.

The cathode compartment 1 can be defined by an inner surface of the housing 40 and a side of the separator 3 in contact with the catholyte within the cathode compartment 1. The cathode compartment 1 can serve to retain the cathode current collector 5, the catholyte, and a mixing device 4 such as an impeller or stirrer. The circulation of the catholyte within the cathode compartment 1 during operation of the battery can result in the battery being referred to as a flow battery or a flow-assisted battery, as described in more detail herein.

The cathode current collector 5 may be a conductive material to serve as an electrical connection between the catholyte and any cathode material formed on the cathode current collector 5 and the external electrical connections (e.g., a cathode terminal). The cathode current collector 5 can be in the form of a sheet, plate, role, cylinder, or the like within the cathode compartment 1 such that the cathode current collector 5 is in contact with the catholyte as the catholyte is circulated within the cathode compartment 1. While shown in FIG. 1A as a single cathode current collector 5, any number of suitable cathode current collectors 5 can be arranged within the cathode compartment 1 and electrically connected to allow for the deposition of cathode material on the cathode current collector 5 during charging, and the dissolution of the cathode material from the cathode current collector 5 during discharging.

In some embodiments, the current collector comprises a conductive material having a variety of collector configurations, such as for example a conductive mesh, a conductive interwoven mesh, a conductive expanded mesh, a conductive screen, a conductive plate, a conductive foil, a conductive pierced foil, a conductive perforated plate, a conductive perforated foil, a conductive perforated sheet, a sintered porous conductive sheet, a sintered conductive foam, a porous conductive foam, an expanded conductive metal, a perforated conductive metal, a fibrous material, a porous block architecture material, an aerogel, and the like, or combinations thereof.

In some embodiments, the current collector can be formed from a material including, but not limited to, carbon, a metal (e.g., copper, nickel, silver, platinum, brass, an alloy, steel, lead, bismuth, titanium, magnesium, aluminum, silver, or combinations thereof), alloys thereof, or any combination thereof. In an embodiment, the current collector may further comprise a metal deposited (e.g., electroplated, electrodeposited, etc.) on the current collector substrate, such as for example nickel, silver, cadmium, tin, lead, bismuth, or combinations thereof. When the cathode current collector 5 comprises carbon, the carbon can include, but is not limited to, graphite, carbon fiber, carbon black, acetylene black, single walled carbon nanotubes, multi-walled carbon nanotubes, graphene, graphyne, graphene oxide, nitrogen-doped carbon, or combinations thereof.

The cathode compartment 1 can comprise a catholyte that serves as an ion transporter that can store the manganese ionic species such as an aqueous battery electrolyte or an aqueous electrolyte. In an embodiment, the catholyte can comprises any suitable aqueous electrolyte comprising ionic conductivity and with a pH value between 0 and 7. In some embodiments, the catholyte can contain a mixed solution (e.g., a mixed aqueous solution) comprising at least one of manganese sulfate, manganese chloride, manganese nitrate, manganese perchlorate, manganese acetate, manganese bis (trifluoromethanesulfonate), manganese triflate, manganese carbonate, manganese oxalate, manganese fluorosilicate, manganese ferrocyanide, manganese bromide, nitric acid, sulfuric acid, hydrochloric acid, sodium sulfate, potassium sulfate, sodium hydroxide, potassium hydroxide, potassium permanganate, titanium sulfate, titanium chloride, lithium nitrate, lithium chloride, lithium bromide, lithium bicarbonate, lithium acetate, lithium sulfate, lithium permanganate, lithium nitrate, lithium nitrite, lithium hydroxide, lithium perchlorate, lithium oxalate, lithium fluoride, lithium carbonate, lithium bromate or combinations thereof. It will be appreciated that during the discharge process, the manganese dioxide on the anode will undergo electro-dissolution and form manganese ions in the catholyte. As a result, the catholyte composition will vary during the charging and discharging processes.

During use of the battery, manganese dioxide can be electroplated from the catholyte onto the cathode current collector 5 as a solid material during the recharging process, and the cathode material can dissolve through electro-dissolution into the catholyte during the discharging process. When plated on the cathode current collector 5, the cathode material can comprise manganese dioxide. In some embodiments, the manganese dioxide can be in the form of α, β, γ, λ, ε, δ, electrolytic manganese dioxide, pyrolusite, birnessite, ramsdellite, hollandite, romanechite, todorokite, lithiophorite, chalcophanite, sodium or potassium rich birnessite, cryptomelane, buserite, manganese oxide, a spinel form of manganese dioxide. When the spinel form of manganese dioxide is present, the spinel form of manganese dioxide can be hausmannite ($Mn_3O_4$), $LiMn_2O_4$, $CuMn_2O_4$, $ZnMn_2O_4$, or combinations thereof.

During use, the catholyte solution may be continuously circulated within the cathode compartment, thereby keeping the electrolyte solution well mixed and ensuring an even, homogenous mixture and temperature of the catholyte solution. Without wishing to be limited by theory, the concentration of manganese species in the catholyte solution decreases during charging of the flow-assisted battery, and the continuous circulation of the catholyte solution maintains the concentration of the manganese species relatively uniform throughout the solution, thereby helping to ensure a uniform deposition of manganese dioxide onto the cathode current collector 5.

The mixing device 4 can comprise any device capable of circulating the catholyte within the cathode compartment 1. In some embodiments, the mixing device 4 can comprise a powering device and an impeller assembly. The powering device may be located outside the housing 40 (e.g., a dry side of the battery housing), and the impeller assembly may be located inside the battery housing (e.g., a wet side of the battery housing). The power device and the impeller can be physically coupled (e.g., using a shaft, etc.) or magnetically coupled through the housing 40. The mixing device 4 may provide a continuous flow of the catholyte solution within the cathode compartment 1. While discussed in terms of an impeller, it should be understood that any other suitable mixing mechanism and/or device may be used for providing a continuous flow of the catholyte solution within the battery housing 40 of a flow-assisted battery.

In an embodiment, the mixing device 4 may comprise a powering device and an impeller assembly, wherein the powering device may be located outside the battery housing 40 (e.g., a dry side of the battery housing, an outer surface of the battery housing, etc.). The powering device may be coupled (e.g., joined, affixed, secured, connected, fastened, attached, etc.) onto an outer surface of the battery housing 40. In an embodiment, the powering device may impart a rotational motion to (e.g., spin, rotate, turn, revolve, gyrate, twirl, etc.) a shaft and/or impeller through the housing, thereby providing a continuous flow of the electrolyte solution within the battery housing of a flow-assisted battery. In an embodiment, the impeller assembly may be located/supported within the cathode compartment 1 within the battery housing 40.

The impeller and any other portion of the mixing device exposed to the catholyte may comprise a polymer or other chemically resistant material and/or coating. The material and/or coating may serve to protect the magnets or other metallic components from reacting with the catholyte solution. Any suitable polymer or chemically resistant material that is chemically inert or resistant to the components of the catholyte may be used. Suitable coating materials can include, but are not limited to, polytetrafluoroethylene (PTFE), DELRIN, noryl resin, a ceramic material, etc. DELRIN is an acetal resin commercially available from DuPont. Noryl resin is a blend of polyphenylene oxide and polystyrene, and is commercially available from SABIC.

As shown in FIG. 1A, the battery 100 also comprises the anode compartment 2. The anode compartment 2 can be defined by an inner surface of the housing 40 and a side of the separator 3 in contact with the anolyte within the anode compartment 2. The anode compartment 2 can serve to retain the anode current collector 6, the anolyte, and a mixing device 4 such as an impeller or stirrer.

The anode current collector 6 may be a conductive material to serve as an electrical connection between the anolyte and any anode material (e.g., Zn) formed on the anode current collector 6 and the external electrical connections. The anode current collector 6 can be in the form of a sheet, plate, role, cylinder, or the like within the anode compartment 2 such that the anode current collector 6 is in contact with the anolyte as the anolyte is circulated within the anode compartment 2. While shown in FIG. 1A as a single anode current collector 6, any number of suitable anode current collectors 6 can be arranged within the anode compartment 2 and electrically connected to allow for the deposition of anode material on the anode current collector 6 during charging and the dissolution of the anode material from the anode current collector 6 during discharging.

The anode current collector 6 can comprises any of the types and materials as described with respect to the cathode current collector 5. For example, the anode current collector 6 can be in the form of a conductive mesh, a conductive interwoven mesh, a conductive expanded mesh, a conductive screen, a conductive plate, a conductive foil, a conductive pierced foil, a conductive perforated plate, a conductive perforated foil, a conductive perforated sheet, a sintered porous conductive sheet, a sintered conductive foam, a porous conductive foam, an expanded conductive metal, a perforated conductive metal, a fibrous material, a porous block architecture material, an aerogel, and the like, or combinations thereof.

The anode current collector 6 can be the same or similar to the cathode current collector 5 and can comprise any of the materials described with respect to the cathode current collector 5. For example, the anode current collector 6 can be formed from a material comprising carbon, a metal (e.g., copper, nickel, silver, platinum, brass, an alloy, steel, lead, bismuth, titanium, magnesium, aluminum, silver, or combinations thereof), alloys thereof, or any combination thereof. In an embodiment, the anode current collector 6 may further comprise a metal deposited (e.g., electroplated, electrodeposited, etc.) on the current collector substrate, such as for example nickel, silver, cadmium, tin, lead, bismuth, or combinations thereof. When the anode current collector 6 comprises carbon, the carbon can include, but is not limited to, graphite, carbon fiber, carbon black, acetylene black, single walled carbon nanotubes, multi-walled carbon nanotubes, graphene, graphyne, graphene oxide, nitrogen-doped carbon, or combinations thereof.

The anode compartment 2 can comprise an anolyte that serves as an ion transporter such as an aqueous battery electrolyte or an aqueous electrolyte. In an embodiment, the anolyte can comprises any suitable aqueous electrolyte comprising ionic conductivity and with a pH value between 0 and 15.13. In some embodiments, the anolyte can contain a mixed solution (e.g., an aqueous mixed solution, etc.) comprising at least one of zinc sulfate, zinc triflate, zinc chloride, zinc acetate, zinc carbonate, zinc chlorate, zinc fluoride, zinc formate, zinc nitrate, zinc oxalate, zinc sulfite, zinc tartrate, zinc cyanide, zinc oxide, sodium hydroxide, potassium hydroxide, lithium hydroxide, potassium chloride, sodium chloride, potassium fluoride, lithium nitrate, lithium chloride, lithium bromide, lithium bicarbonate, lithium acetate, lithium sulfate, lithium permanganate, lithium nitrate, lithium nitrite, lithium perchlorate, lithium oxalate, lithium fluoride, lithium carbonate, lithium bromate, or any combinations thereof. The anolyte can also comprise one or more alkaline hydroxides such as NaOH, KOH, LiOH, or mixtures thereof. It will be appreciated that during the discharge process, the zinc on the anode will undergo electro-dissolution and form zinc ions in the anolyte. As a result, the anolyte composition will vary during the charging and discharging processes.

During use of the battery, zinc can be electroplated from the anolyte onto the anode current collector 6 as a solid material during the recharging process, and the anode material can dissolve through electro-dissolution into the anolyte during the discharging process. When plated on the anode current collector 6, the anode material can comprise zinc. Without wishing to be limited by theory, Zn as part of the Zn anode is an electrochemically active material, and will participate in a redox reaction, thereby contributing to the overall voltage of the battery.

During use, the anolyte solution may be continuously circulated within the anode compartment, thereby keeping the electrolyte solution well stirred and ensuring an even, homogenous mixture and temperature of the anolyte solution. Without wishing to be limited by theory, the concentration of zinc species in the anolyte solution decreases during charging of the battery, and the continuous circulation of the anolyte solution maintains the concentration of the zinc species relatively uniform throughout the solution, thereby helping to ensure a uniform deposition of zinc onto the anode current collector 6.

The mixing device 4 can comprise any device capable of circulating the anolyte within the anode compartment 2, including any of those disclosed with respect to the mixing device with regard to the cathode compartment 1. The circulation of the anolyte within the anode compartment 2 during operation of the battery can result in the battery being referred to as a flow battery or a flow-assisted battery.

Figure 1B:
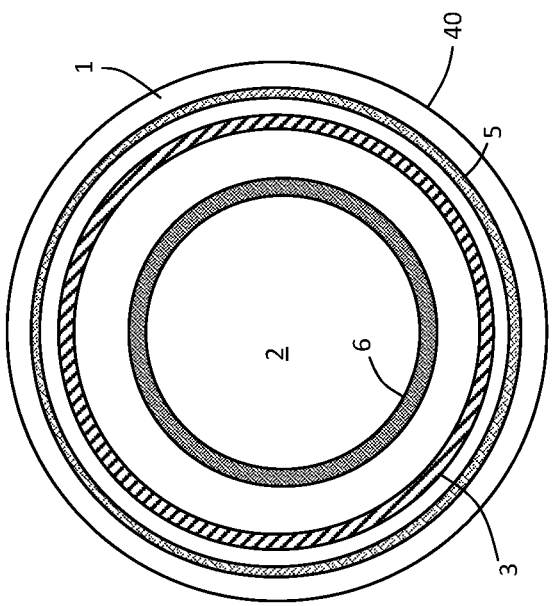
FIG. 1B illustrates a schematic drawing of another flow battery according to an embodiment.

The schematic illustration in FIG. 1A demonstrates the relative placement of the cathode compartment 1, the anode compartment 2, the cathode current collector 5, the anode current collector 6, and the respective mixing devices 4, all within the housing 40. The configuration of the components can include any suitable configuration that allows the cathode compartment 1 to be separated from the anode compartment by the separator 3. As a possible configuration, FIG. 1B illustrates a cylindrical design of the battery. In this design, the housing 40 can have a cylindrical shape with the cathode compartment 1 formed between an outer surface of the separator 3 and an inner surface of the housing 40, where "inner" and "outer" are relative to a central axis of the cylindrical housing 40. The housing 40 can have a flat top and bottom. The separator 3 can be in the form of a cylindrical separator that can form a seal with the top and bottom of the housing 40 to serve as an ion mediator between the catholyte in the cathode compartment 1 and the anolyte in the anode compartment 2. The cathode current collector 5 can be in the form of a cylindrical current collector 5 disposed between the outer surface of the separator 3 and the inner surface of the housing 40. While shown as cylindrical in shape, other shapes such as a wave or corrugated design (e.g., a pleated design), individual sheets, overlapping sheets, fibers, fibrous mats, or the like are also possible for the cathode current collector 5. A mixing device can be disposed to cause a flow of the catholyte within the cathode compartment 1, and there can be sufficient space or porosity in or around the cathode current collector 5 to allow for such flow.

As shown in FIG. 1B, the anode compartment 2 can be formed between an inner surface of the separator 3 and a top and bottom of the housing 40. The anode current collector 6 can be in the form of a cylindrical current collector 6 disposed within the inner surface of the separator 3. While shown as cylindrical in shape, other shapes such as a wave or corrugated design (e.g., a pleated design), individual sheets, overlapping sheets, fibers, fibrous mats, or the like are also possible for the anode current collector 6. A mixing device can be disposed to cause a flow of the anolyte within the anode compartment 2, and there can be sufficient space or porosity in or around the anode current collector 6 to allow for such flow.

While shown in FIG. 1B as having the cathode compartment 1 outside of and surrounding the anode compartment 2, the cathode compartment 1 could be on the inside of the housing 40 surrounded by the anode compartment 2. Further, while shown as being concentric, the separator could also run longitudinally to divide the cylindrical housing 40 in half as a sheet through the middle. The respective cathode compartment 1 and the anode compartment 2 could then be formed on either side of the separator 3. Other suitable arrangements within a cylindrical housing 40 are also possible (e.g., an upper and lower division, etc.).

Figure 1C:
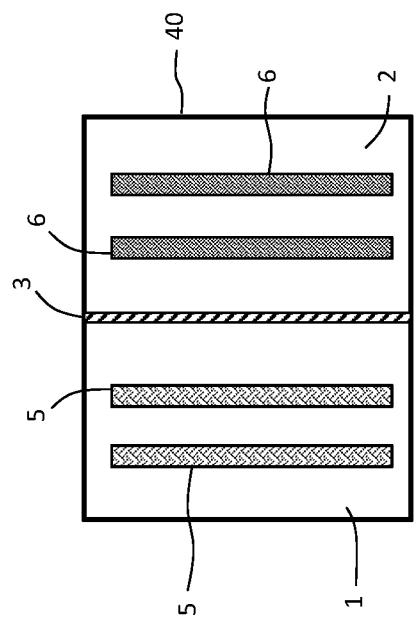
FIG. 1C illustrates a schematic drawing of still another flow battery according to an embodiment.

FIG. 1C shows a further configuration of the housing 40 in a prismatic design. In this design, the housing 40 can be in the form of a rectilinear box. A separator 3 in the form of a sheet can divide the housing 40 into a cathode compartment 1 and an anode compartment 2. The cathode compartment 1 can be formed between a surface of the separator 3 in contact with the catholyte and an inner surface of the housing 40. The separator 3 can form a seal with the housing 40 to serve as an ion mediator between the catholyte in the cathode compartment 1 and the anolyte in the anode compartment 2. The cathode current collector 5 can be in the form of one or more sheets disposed within the cathode compartment 1. While shown as two sheets, additional sheets are also possible. In addition, other shapes such as a wave or corrugated design (e.g., a pleated design), overlapping sheets, fibers, a fibrous mat, or the like in any of the forms described herein are also possible for the cathode current collector 5. A mixing device can be disposed within the cathode compartment 1 to cause a flow of the catholyte within the cathode compartment 1, and there can be sufficient space or porosity in or around the cathode current collector 5 to allow for such flow.

As shown in FIG. 1C, the anode compartment 2 can be formed between a surface of the separator 3 in contact with the anolyte and an inner surface of the housing 40. The anode current collector 6 can be in the form of one or more sheets disposed within the anode compartment 2. While shown as two sheets, additional sheets are also possible. In addition, other shapes such as a wave or corrugated design (e.g., a pleated design), overlapping sheets, fibers, a fibrous mat, or the like in any of the forms described herein are also possible for the anode current collector 6. A mixing device can be disposed within the anode compartment 2 to cause a flow of the anolyte within the anode compartment 2, and there can be sufficient space or porosity in or around the anode current collector 6 to allow for such flow.

While FIGS. 1A-1C illustrate embodiments in which the cathode compartment 1 and the anode compartment 2 have approximately equal volumes, the cathode compartment 1 and the anode compartment 2 can be sized to provide approximately equal capacities between the anode and the cathode. The volume of each compartment can be based on a composition of the anolyte and catholyte, an amount of the active cathode material and anode material, a volume and type of the current collector, and a design of the housing and mixing device, among other considerations. The location of the separator 3 can also be selected to provide selective ion communication between the compartments while balancing the respective capacities of each electrode.

FIGS. 1A-1C illustrate embodiments in which the anolyte and catholyte are stored within the anode compartment 2 and the cathode compartment 1, respectively. In some embodiments, the anolyte and catholyte can be stored, at least partially, within outside vessels and pumped to respective anode compartment(s) and cathode compartment(s), respectively. The ability to provide additional catholyte and/or anolyte storage allows for a larger volume of the cathode material and anode material, e.g., manganese/zinc, etc., to be stored in the catholyte and/or anolyte during the discharge process. This can allow for a larger capacity battery without the cathode compartment 1 and/or anode compartment 2 needing to be as large to store an appropriate amount of catholyte and/or anolyte within the respective compartment.

Figure 2:
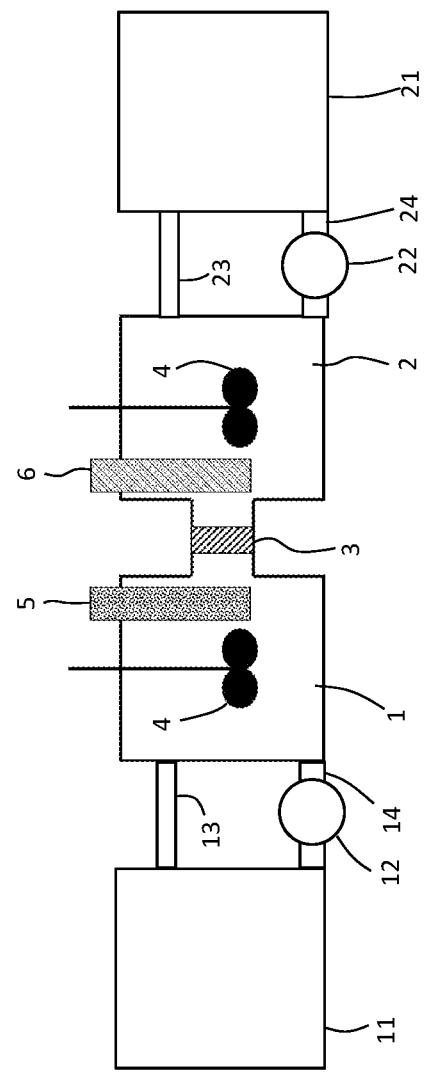
FIG. 2 illustrates a schematic drawing of a flow battery according to an embodiment.

FIG. 2 illustrates an exemplary embodiment. As shown in FIG. 2, the components of the battery can be the same or similar to those discussed with respect to FIGS. 1A-1C. The main difference between the embodiment of FIG. 2 and that of FIG. 1A is the presence of a catholyte vessel 11 coupled to the cathode compartment 1 through flow lines 13, 14. A pump or other fluid transfer device 12 can be used to circulate the catholyte between the cathode compartment 1 and the catholyte vessel 11. As an example, the pump can be used to transfer the catholyte from the cathode compartment 1 to the catholyte vessel 11 through the lower flow line 14. Upon filling, the catholyte can flow back to the cathode compartment 1 through the upper flow line 13, thereby allowing circulation of the catholyte between the cathode compartment 1 and the catholyte vessel 11.

When an external vessel is used to store the catholyte, the mixing device 4 may or may not be needed. In some embodiments, the mixing device is present within the cathode compartment 1 to aid in circulating the catholyte and maintaining a uniform concentration of the components of the catholyte within the cathode compartment 1. In some embodiments, the mixing device 4 is not present when the catholyte vessel 11 is present. In these embodiments, the fluid transfer device 12 may be used to create a sufficient flow rate and/or flow pattern within the cathode compartment to maintain a suitably uniform concentration of the catholyte within the cathode compartment 1. In some embodiments, the fluid transfer device 12 and the mixing device 4 can be the same components. For example, a mixing device in the form of an impeller can be placed within the cathode compartment 1 at or near an entrance to a flow line 13, 14 to create both circulation within the cathode compartment 1 as well as a flow of the catholyte through the flow line 13, 14 and into the catholyte vessel to also create a larger circulation of the catholyte. In some embodiments, a mixing device may also be present in the catholyte vessel 11 to help improve the uniformity of the catholyte within the catholyte vessel, if needed.

The battery of FIG. 2 can also include an anolyte vessel 21 coupled to the anode compartment 2 through flow lines 23, 24. A pump or other fluid transfer device 22 can be used to circulate the anolyte between the anode compartment 2 and the anolyte vessel 21. As an example, the pump can be used to transfer the anolyte from the anode compartment 2 to the anolyte vessel 21 through the lower flow line 24. Upon filling, the anolyte can flow back to the anode compartment 2 through the upper flow line 23, thereby allowing circulation of the catholyte between the anode compartment 2 and the anolyte vessel 21.

When an external vessel is used to store the anolyte, the mixing device 4 may or may not be needed. In some embodiments, the mixing device is present within the anode compartment 2 to aid in circulating the anolyte and maintaining a uniform concentration of the components of the anolyte within the anode compartment 2. In some embodiments, the mixing device 4 is not present when the anolyte vessel 21 is present. In these embodiments, the fluid transfer device 22 may be used to create a sufficient flow rate and/or flow pattern within the anode compartment 2 to maintain a suitably uniform concentration of the anolyte within the anode compartment 2. In some embodiments, the fluid transfer device 22 and the mixing device 4 can be the same components. For example, a mixing device in the form of an impeller can be placed within the anode compartment 2 at or near an entrance to a flow line 23, 24 to create both circulation within the anode compartment 2 as well as a flow of the anolyte through the flow line 23, 24 and into the anolyte vessel 21 to also create a larger circulation of the anolyte. In some embodiments, a mixing device may also be present in the anolyte vessel 21 to help improve the uniformity of the anolyte within the anolyte vessel, if needed.

While FIG. 2 illustrates two external vessels, only one of the catholyte vessel 11 or the anolyte vessel 21 may be used. Further, the size of each vessel used can be selected based on the amount of catholyte and/or anolyte that needs to be stored. In some embodiments, a plurality of batteries can be present that are connected to electrolyte vessels. In these embodiments, each battery can have corresponding electrolyte vessels, or a plurality of batteries can be fluidly coupled to a single electrolyte vessel. This may allow for a number of cathode compartments to share a single catholyte among the batteries or cells, and/or a number of anode compartments can share a single anolyte among the batteries or cells. Other configurations are also possible.

Any of the batteries and configurations described herein can be used to produce power during a discharge process and store power during a recharge process. During a cycle of operation of the battery, the zinc ions in the anolyte solution can be deposited as metallic Zn on the anode current collector(s) 6 of the anodes during charging. As the battery discharges in use, the metallic zinc deposited on the anode current collector(s) 6 can be oxidized to form zinc ions, which then dissolve back into the anolyte solution. Similarly, the manganese ions in the catholyte solution can be deposited as manganese dioxide on the cathode current collector(s) 5 of the cathode during charging. As the battery discharges in use, the manganese dioxide deposited on the cathode current collector(s) 5 can be dissolved to form various manganese species, which then dissolves back into the catholyte solution. During this process, the anolyte and catholyte are maintained as separate electrolytes using the separator 3 to prevent mixing of the components. Ions can selectively pass through the separator 3 to maintain the flow of electrons during the charging and discharging processes. This can allow the compositions and properties of the anolyte and catholyte to be different throughout the use of the battery.

During use, the respective anolyte and catholyte solutions may be continuously circulated within the anode compartment 2 and the cathode compartment 1, respectively, by using a mixing device, thereby keeping each electrolyte solution well stirred and ensuring an even, homogenous mixture and temperature of the electrolyte solution. Without wishing to be limited by theory, the concentration of zinc species in the anolyte solution decreases during charging of the battery, and the continuous circulation of the anolyte solution maintains the concentration of the zinc species relatively uniform throughout the solution, thereby minimizing Zn dendrite formation and ensuring an uniform deposition of Zn onto the anode current collector 6.

In an embodiment, continuous circulation of the anolyte solution within the anode compartment 2 may allow complete dissolution of all Zn from the anode and/or complete dissolution during discharge. When the anode and cathode capacities are balanced, the continuous circulation of the catholyte solution within the cathode compartment 1 may allow complete dissolution of the manganese dioxide from the cathode and/or complete dissolution during discharge. In some embodiments, the battery can be subjected to a reconditioning cycle, wherein all of the Zn and/or $MnO_2$ could be dissolved/removed from the anode and/or cathode, respectively, thereby allowing the anodes to return to their original condition (e.g., a condition prior to utilizing the battery). In some embodiments, the reconditioning cycle can be performed at various time (e.g., periodically, at scheduled times, when needed, etc.) during a life of the battery to improve performance of the battery and lengthen the life of the battery. In an embodiment, the reconditioning cycle can be performed at least once every 20 charge/discharge cycles, alternatively at least once every 25 charge/discharge cycles, or alternatively at least once every 30 charge/discharge cycles. In some embodiments, the reconditioning cycle may be performed when one or more operational parameters of the battery drop below a threshold.

In an embodiment, a method of producing energy may comprise the steps of: (i) providing a battery assembled as disclosed herein; (ii) charging the battery to a charge voltage, wherein zinc ions from the electrolyte solution is deposited as electrodeposited Zn on the anode current collector 6 of the Zn anode and manganese is deposited as manganese dioxide on the cathode current collector 5 of the cathode; (iii) discharging the battery to a discharge voltage to produce energy, wherein at least a portion of the electrodeposited Zn and manganese dioxide is dissolved and transferred back into the anolyte and catholyte solutions, respectively; (iv) optionally further discharging the battery to a final voltage below said discharge voltage, wherein the electrodeposited Zn and/or manganese dioxide are completely removed from the anode and/or cathode, respectively; and (v) continuously circulating the anolyte solution within the anode compartment 2 and the catholyte solution within the cathode compartment 1 during the steps of charging, discharging, and optionally, further discharging the battery to said final voltage by using a mixing device or fluid transfer device.

The battery can be operated at a temperature between about 0° C. and about 200° C. such that each of the anolyte and catholyte can have a temperature between about 0° C. and about 200° C. during use. The anolyte can have a pH during use of between 0 and 15.13, and the catholyte can have a pH during use of between 0 and 7. The anolyte and catholyte can have different compositions and pHs during use. In some embodiments, the pH of the anolyte can be higher than that of the catholyte. In some embodiments, the catholyte can have an acid pH (e.g., between 0 and 7), and the anolyte can have a basic pH (e.g., between 7 and 15.13). In some embodiments, a difference in the pH between the catholyte and the anolyte can be greater than about 3, greater than about 4, greater than about 5, greater than about 6, greater than about 7, greater than about 8, greater than about 9, greater than about 10, greater than about 11, greater than about 12, or greater than about 13.

The ability to have different compositions for the anolyte and catholyte can provide improved performance from the battery. The ability to operate at different pHs between the anolyte and catholyte can result in a much higher cell voltage compared to any cell using a single electrolyte in manganese dioxide-zinc chemistry. The resulting discharge for a cell using different anolyte and catholyte compositions can be between 0 and about 3.5 V as measured between the terminals of the anode and cathode. As shown in the Examples herein, average discharge potentials of ~2.2-2.3V vs zinc, are higher than those achievable for manganese dioxide-zinc batteries using a single electrolyte or electrolytes having similar pHs. In some embodiments, the battery can operate between 0-100% of the theoretical capacity of manganese dioxide (e.g., to the $2^{nd}$ electron stage), and/or operate between 0-100% of the theoretical capacity of zinc. Thus, the present systems and methods provide a high voltage manganese dioxide-zinc battery.

EXAMPLES

The embodiments having been generally described, the following examples are given as particular embodiments of the disclosure and to demonstrate the practice and advantages thereof. It is understood that the examples are given by way of illustration and are not intended to limit the specification or the claims in any manner.

Example 1

A two chamber cell was designed as shown in FIG. 1A, wherein the catholyte was 1M manganese sulfate with 0.5M sulfuric acid, and the anolyte was 1M zinc sulfate with 0.5M sulfuric acid. The pH of the catholyte was near 1, while that of the anolyte was greater than 3. Nafion was used as the separator. Carbon cloth was used as the cathode current collector and copper foil was used as the cathode current collector.

Figure 3:
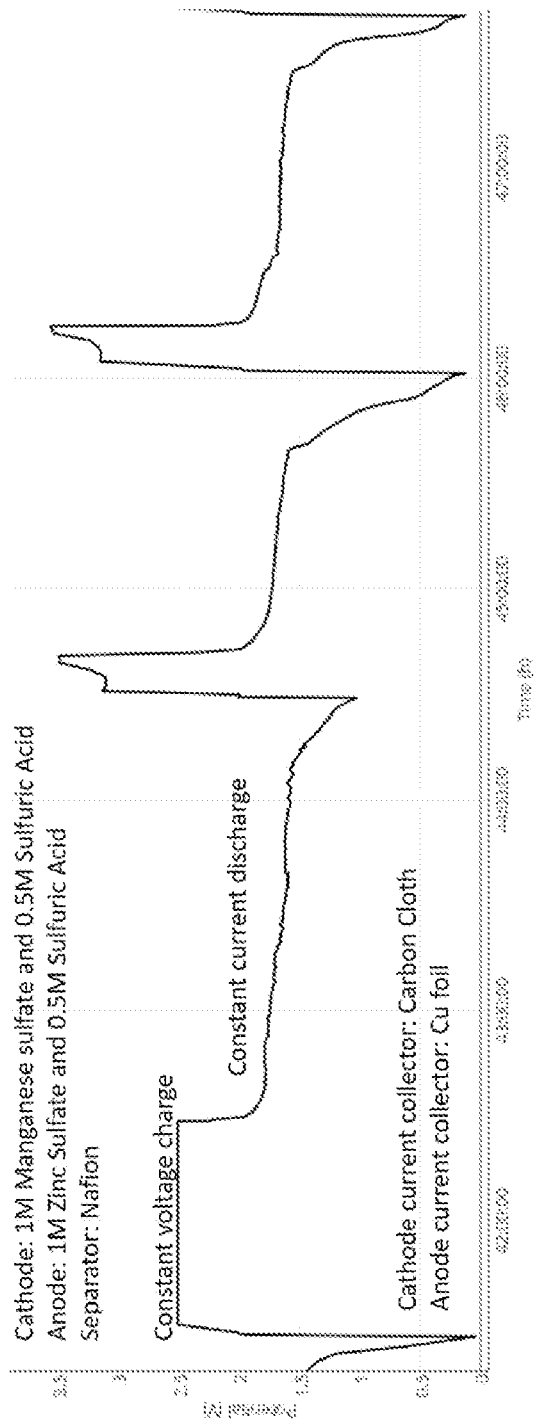
FIG. 3 illustrates a potential-time curve showing the results of Example 1, where the catholyte and anolyte are both acidic solutions.

The potential versus time measurements of the cell are shown in FIG. 3, where a constant voltage at 2.5V was used for plating zinc and manganese dioxide from the anolyte and catholyte solutions on the respective current collectors. The soluble manganese and zinc ions in the solution plated on the current collectors as solid products. The cell was kept on constant voltage till a certain capacity was reached after which the cell was discharged to that same capacity. As shown in FIG. 3, the average cell discharge potential of the new cell (1.8-1.9V) was considerably higher than alkaline manganese dioxide-zinc batteries (~1-1.25V). The discharged products ended up in solution as their original ions, which were available again to be plated in the subsequent charge. The subsequent charge and discharge cycles are also shown in FIG. 3, where the cell performance was replicable.

Example 2

A two chamber cell was designed as shown in FIG. 1A, wherein the catholyte was 1M manganese sulfate and 0.5M sulfuric acid and the anolyte was 20 wt. % potassium hydroxide with 25 g/L zinc oxide and 1M potassium chloride. The pH of the catholyte was near 1, while the pH of the anolyte was greater than 14. A bipolar membrane capable of separation H+ and OH− ions was used as the separator. Carbon felt was used as the cathode current collector and copper foil was used as the cathode current collector.

Figure 4:
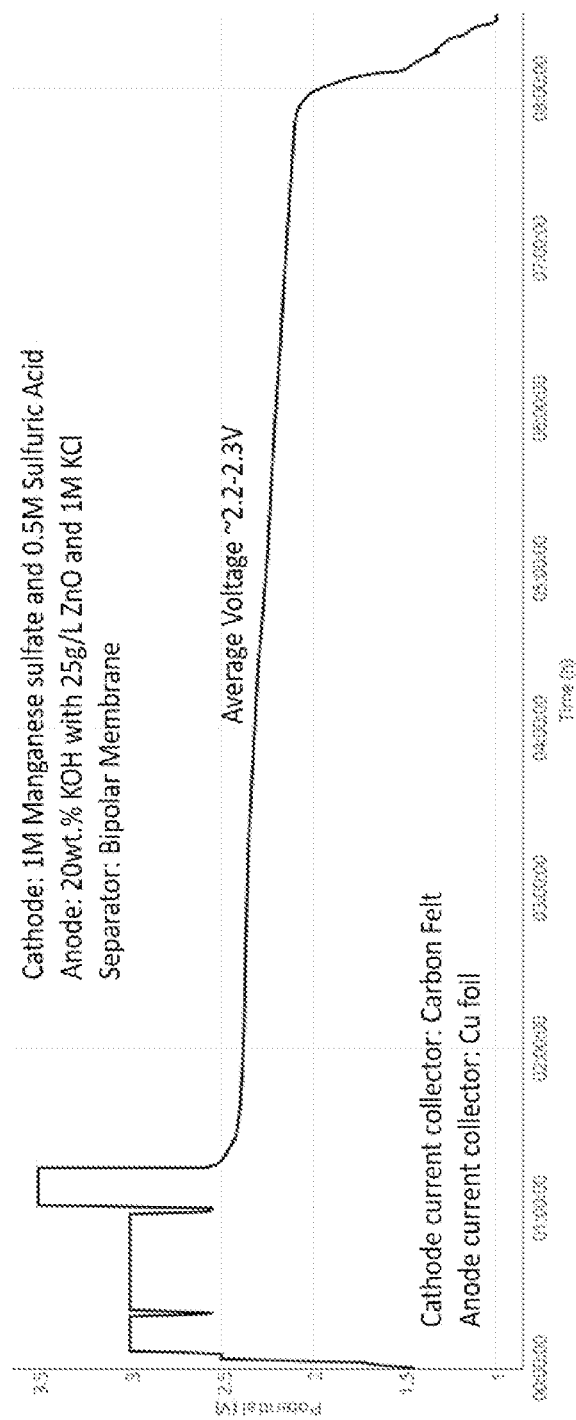
FIG. 4 illustrates a potential-time curve showing the results of Example 2, where the catholyte is acidic and the anolyte is basic.

The performance of this cell is shown in FIG. 4, where the high pH differences resulted in a much higher cell voltage compared to any cell achieved in manganese dioxide-zinc chemistry. A constant potential was used for charging the cell. During charge up, the manganese dioxide plated onto the cathode and zinc metal plated onto the anode. The open circuit voltage (OCV) of the cell after charge was ~2.55V, which is close to theoretical. A mercury/mercury oxide reference electrode was used to monitor the Zn electrode during the plating process, which showed a potential of −1.34V at OCV indicating its charged state. This meant that the $MnO_2$ was around 1.21V vs a normal hydrogen electrode, which is close to its theoretical value (1.23V) in acidic solution. This indicated that the plating process was successful. A discharge was carried out as shown in FIG. 4, which showed an average discharge potential of ~2.2-2.3V vs zinc, which is the highest ever reported in literature for this chemistry. This is the first such demonstration of a high voltage ion-mediated manganese dioxide-zinc battery that is flow-assist.

Having described various systems and methods herein, specific embodiments can include, but are not limited to:

In a first embodiment, a battery comprises: a cathode compartment; a catholyte solution disposed within the cathode compartment; an anode compartment; an anolyte solution disposed within the anode compartment, wherein the catholyte solution and the anolyte solution have different compositions; a separator disposed between the cathode compartment and the anode compartment; and a flow system configured to provide fluid circulation in the cathode compartment and the anode compartment.

A second embodiment can include the battery of the first embodiment, further comprising: an anode current collector disposed in the anode compartment, wherein the anode current collector is made of at least one material comprising: carbon, lead, copper, nickel, bismuth, titanium, magnesium, aluminum, silver, or combinations thereof; and a cathode current collector disposed in the cathode compartment, wherein the cathode current collector is made of at least one material comprising: carbon, lead, copper, nickel, bismuth, titanium, magnesium, aluminum, silver, or combinations thereof.

A third embodiment can include the battery of the second embodiment, wherein at least one of the cathode current collector or the anode current collector comprises carbon, and wherein the carbon is graphite, carbon fiber, carbon black, acetylene black, single walled carbon nanotubes, multi-walled carbon nanotubes, graphene, graphyne, graphene oxide, nitrogen-doped carbon, or combinations thereof.

A fourth embodiment can include the battery of the second or third embodiment, wherein the anode current collector, the cathode current collector, or both are in the form of a mesh, foil, foam, fibrous, a porous block architecture, an aerogel, or a combination thereof.

A fifth embodiment can include the battery of any one of the second to fourth embodiments, wherein a cathode material comprising manganese dioxide is electroplated on the cathode current collector, and wherein the manganese dioxide is α, β, γ, λ, ε, δ, electrolytic manganese dioxide, pyrolusite, birnessite, ramsdellite, hollandite, romanechite, todorokite, lithiophorite, chalcophanite, sodium or potassium rich birnessite, cryptomelane, buserite, manganese oxide, a spinel form of manganese dioxide.

A sixth embodiment can include the battery of the fifth embodiment, wherein the spinel form of manganese dioxide is hausmannite ($Mn_3O_4$), $LiMn_2O_4$, $CuMn_2O_4$, $ZnMn_2O_4$, or combinations thereof.

A seventh embodiment can include the battery of any one of the first to sixth embodiments, wherein the catholyte solution in the cathode compartment contains a mixed solution comprising at least one of manganese sulfate, manganese chloride, manganese nitrate, manganese perchlorate, manganese acetate, manganese bis(trifluoromethanesulfonate), manganese triflate, manganese carbonate, manganese oxalate, manganese fluorosilicate, manganese ferrocyanide, manganese bromide, nitric acid, sulfuric acid, hydrochloric acid, sodium sulfate, potassium sulfate, sodium hydroxide, potassium hydroxide, potassium permanganate, titanium sulfate, titanium chloride, lithium nitrate, lithium chloride, lithium bromide, lithium bicarbonate, lithium acetate, lithium sulfate, lithium permanganate, lithium nitrate, lithium nitrite, lithium hydroxide, lithium perchlorate, lithium oxalate, lithium fluoride, lithium carbonate, lithium bromate, or any combination thereof.

An eighth embodiment can include the battery of any one of the first to seventh embodiments, wherein the anolyte solution in the anode compartment is a mixed solution comprising at least one of zinc sulfate, zinc triflate, zinc chloride, zinc acetate, zinc carbonate, zinc chlorate, zinc fluoride, zinc formate, zinc nitrate, zinc oxalate, zinc sulfite, zinc tartrate, zinc cyanide, zinc oxide, sodium hydroxide, potassium hydroxide, lithium hydroxide, potassium chloride, sodium chloride, potassium fluoride, lithium nitrate, lithium chloride, lithium bromide, lithium bicarbonate, lithium acetate, lithium sulfate, lithium permanganate, lithium nitrate, lithium nitrite, lithium perchlorate, lithium oxalate, lithium fluoride, lithium carbonate, lithium bromate or combinations thereof.

A ninth embodiment can include the battery of any one of the first to eighth embodiments, wherein the separator is lithium super ionic conductor (LISICON), sodium super ionic conductions (NASICON), Nafion, a bipolar membrane, water electrolysis membrane, a composite of polyvinyl alcohol and graphene oxide, Celgard, cellophane or combinations thereof.

A tenth embodiment can include the battery of any one of the first to ninth embodiments, further comprising: a catholyte vessel in fluid communication with the cathode compartment, where at least a portion of the catholyte is disposed in the catholyte vessel.

An eleventh embodiment can include the battery of any one of the first to tenth embodiments, further comprising: an anolyte vessel in fluid communication with the anode compartment, wherein at least a portion of the anolyte is disposed in the anolyte vessel.

A twelfth embodiment can include the battery of any one of the first to eleventh embodiments, wherein the battery is cylindrical or prismatic.

A thirteenth embodiment can include the battery of any one of the first to twelfth embodiments, wherein the catholyte solution has a pH between 0 and 7.

A fourteenth embodiment can include the battery of any one of the first to thirteenth embodiments, wherein the anolyte solution has a pH between 0 and 15.13.

A fifteenth embodiment can include the battery of any one of the first to fourteenth embodiments, wherein the pH of the anolyte solution is greater than the pH of the catholyte solution.

A sixteenth embodiment can include the battery of any one of the first to fifteenth embodiments, wherein the anolyte solution is basic, and wherein the catholyte solution is acidic.

In a seventeenth embodiment, a method of operating a battery comprises: circulating a catholyte solution within a cathode compartment of a battery, wherein the catholyte solution comprises manganese ions; circulating an anolyte solution within an node compartment of the battery, wherein the anolyte solution comprises zinc ions, and wherein the catholyte solution and the anolyte solution have different compositions; preventing direct mixing between the anolyte and the catholyte during the circulating by using a separator disposed between the cathode compartment and the anode compartment; and generating an electrical current from the battery while circulating the catholyte solution and circulating the anolyte solution.

An eighteenth embodiment can include the method of the seventeenth embodiment, wherein the catholyte solution has a temperature between 0° C. and 200° C.

A nineteenth embodiment can include the method of the seventeenth or eighteenth embodiment, wherein the anolyte solution has a temperature between 0° C. and 200° C.

A twentieth embodiment can include the method of any one of the seventeenth to nineteenth embodiments, further comprising: dissolving manganese dioxide from a cathode current collector within the cathode compartment during the generating of the electrical current; and dissolving zinc from an anode current collector within the anode compartment during the generating of the electrical current.

A twenty first embodiment can include the method of the twentieth embodiment, wherein the manganese dioxide is α, β, γ, λ, ε, δ, electrolytic manganese dioxide, pyrolusite, birnessite, ramsdellite, hollandite, romanechite, todorokite, lithiophorite, chalcophanite, sodium or potassium rich birnessite, cryptomelane, buserite, manganese oxide, a spinel form of manganese dioxide.

A twenty second embodiment can include the method of the twenty first embodiment, wherein the spinel form of manganese dioxide is hausmannite ($Mn_3O_4$), $LiMn_2O_4$, $CuMn_2O_4$, $ZnMn_2O_4$, or combinations thereof.

A twenty third embodiment can include the method of any one of the seventeenth to twenty second embodiments, further comprising: ceasing the generating of the electrical current; applying a voltage between a cathode current collector within the cathode compartment and an anode current collector within the anode compartment; electroplating zinc onto the anode current collector in response to applying the voltage; and electroplating manganese dioxide onto the cathode current collector in response to applying the voltage.

A twenty fourth embodiment can include the method of any one of the seventeenth to twenty third embodiments, wherein generating the electrical current comprises generating an electrical current at a voltage between 0 and 3.5V.

A twenty fifth embodiment can include the method of any one of the seventeenth to twenty fourth embodiments, wherein the generating the electrical current uses between 0-100% of the theoretical capacity of manganese dioxide.

A twenty sixth embodiment can include the method of any one of the seventeenth to twenty fifth embodiments, wherein the generating the electrical current uses between 0-100% of the theoretical capacity of Zn.

A twenty seventh embodiment can include the method of any one of the seventeenth to twenty sixth embodiments, further comprising: recharging the battery a plurality of times after generating the electrical current.

A twenty eighth embodiment can include the method of any one of the seventeenth to twenty seventh embodiments, wherein an anode current collector is disposed within the anode compartment, wherein a cathode current collector is disposed within the cathode compartment, and wherein the anode current collector, the cathode current collector, or both comprise at least one material comprising: carbon, lead, copper, nickel, bismuth, titanium, magnesium, aluminum, silver, or combinations thereof.

A twenty ninth embodiment can include the method of the twenty eighth embodiment, wherein at least one of the cathode current collector or the anode current collector comprises carbon, and wherein the carbon is graphite, carbon fiber, carbon black, acetylene black, single walled carbon nanotubes, multi-walled carbon nanotubes, graphene, graphyne, graphene oxide, nitrogen-doped carbon, or combinations thereof.

A thirtieth embodiment can include the method of the twenty eighth embodiment, wherein the anode current collector, the cathode current collector, or both are in the form of a mesh, foil, foam, fibrous, a porous block architecture, an aerogel, or a combination thereof.

A thirty first embodiment can include the method of any one of the seventeenth to thirtieth embodiments, wherein the catholyte solution in the cathode compartment contains a mixed solution comprising at least one of manganese sulfate, manganese chloride, manganese nitrate, manganese perchlorate, manganese acetate, manganese bis(trifluoromethanesulfonate), manganese triflate, manganese carbonate, manganese oxalate, manganese fluorosilicate, manganese ferrocyanide, manganese bromide, nitric acid, sulfuric acid, hydrochloric acid, sodium sulfate, potassium sulfate, sodium hydroxide, potassium hydroxide, potassium permanganate, titanium sulfate, titanium chloride, lithium nitrate, lithium chloride, lithium bromide, lithium bicarbonate, lithium acetate, lithium sulfate, lithium permanganate, lithium nitrate, lithium nitrite, lithium hydroxide, lithium perchlorate, lithium oxalate, lithium fluoride, lithium carbonate, lithium bromate, or any combination thereof.

A thirty second embodiment can include the method of any one of the seventeenth to thirty first embodiments, wherein the anolyte solution in the anode compartment is a mixed solution comprising at least one of zinc sulfate, zinc triflate, zinc chloride, zinc acetate, zinc carbonate, zinc chlorate, zinc fluoride, zinc formate, zinc nitrate, zinc oxalate, zinc sulfite, zinc tartrate, zinc cyanide, zinc oxide, sodium hydroxide, potassium hydroxide, lithium hydroxide, potassium chloride, sodium chloride, potassium fluoride, lithium nitrate, lithium chloride, lithium bromide, lithium bicarbonate, lithium acetate, lithium sulfate, lithium permanganate, lithium nitrate, lithium nitrite, lithium perchlorate, lithium oxalate, lithium fluoride, lithium carbonate, lithium bromate or combinations thereof.

A thirty third embodiment can include the method of any one of the seventeenth to thirty second embodiments, wherein the separator is lithium super ionic conductor (LISICON), sodium super ionic conductions (NASICON), Nafion, a bipolar membrane, water electrolysis membrane, a composite of polyvinyl alcohol and graphene oxide, Celgard, cellophane or combinations thereof.

A thirty fourth embodiment can include the method of any one of the seventeenth to thirty fourth embodiments, further comprising: circulating the anolyte solution between the anode compartment and an anolyte vessel, wherein the anolyte vessel is external to the anode compartment.

A thirty fifth embodiment can include the method of any one of the seventeenth to thirty fifth embodiments, further comprising: circulating the catholyte solution between the cathode compartment and a catholyte vessel, wherein the catholyte vessel is external to the cathode compartment.

A thirty sixth embodiment can include the method of any one of the seventeenth to thirty fifth embodiments, wherein the catholyte solution has a pH between 0 and 7.

A thirty seventh embodiment can include the method of any one of the seventeenth to thirty sixth embodiments, wherein the anolyte solution has a pH between 0 and 15.13.

A thirty eighth embodiment can include the method of any one of the seventeenth to thirty seventh embodiments, wherein the pH of the anolyte solution is greater than the pH of the catholyte solution.

A thirty ninth embodiment can include the method of any one of the seventeenth to thirty eighth embodiments, wherein the anolyte solution is basic, and wherein the catholyte solution is acidic.

The present systems and methods are best understood by reference to the detailed figure and description set forth herein.

Embodiments are discussed below with reference to the Figures. However, those skilled in the art will readily appreciate that the detailed description given herein with respect to these figures is for explanatory purposes as the systems and methods extend beyond these limited embodiments. For example, it should be appreciated that those skilled in the art will, in light of the teachings of the present description, recognize a multiplicity of alternate and suitable approaches, depending upon the needs of the particular application, to implement the functionality of any given detail described herein, beyond the particular implementation choices in the following embodiments described and shown. That is, there are numerous modifications and variations that are too numerous to be listed but that all fit within the scope of the present description. Also, singular words should be read as plural and vice versa and masculine as feminine and vice versa, where appropriate, and alternative embodiments do not necessarily imply that the two are mutually exclusive.

It is to be further understood that the present description is not limited to the particular methodology, compounds, materials, manufacturing techniques, uses, and applications, described herein, as these may vary. It is also to be understood that the terminology used herein is used for the purpose of describing particular embodiments only, and is not intended to limit the scope of the present systems and methods. It must be noted that as used herein and in the appended claims (in this application, or any derived applications thereof), the singular forms "a," "an," and "the" include the plural reference unless the context clearly dictates otherwise. Thus, for example, a reference to "an element" is a reference to one or more elements and includes equivalents thereof known to those skilled in the art. All conjunctions used are to be understood in the most inclusive sense possible. Thus, the word "or" should be understood as having the definition of a logical "or" rather than that of a logical "exclusive or" unless the context clearly necessitates otherwise. Structures described herein are to be understood also to refer to functional equivalents of such structures. Language that may be construed to express approximation should be so understood unless the context clearly dictates otherwise.

Unless defined otherwise, all technical and scientific terms used herein have the same meanings as commonly understood by one of ordinary skill in the art to which this description belongs. Preferred methods, techniques, devices, and materials are described, although any methods, techniques, devices, or materials similar or equivalent to those described herein may be used in the practice or testing of the present systems and methods. Structures described herein are to be understood also to refer to functional equivalents of such structures. The present systems and methods will now be described in detail with reference to embodiments thereof as illustrated in the accompanying drawings.

From reading the present disclosure, other variations and modifications will be apparent to persons skilled in the art. Such variations and modifications may involve equivalent and other features which are already known in the art, and which may be used instead of or in addition to features already described herein.

Although Claims may be formulated in this Application or of any further Application derived therefrom, to particular combinations of features, it should be understood that the scope of the disclosure also includes any novel feature or any novel combination of features disclosed herein either explicitly or implicitly or any generalization thereof, whether or not it relates to the same systems or methods as presently claimed in any Claim and whether or not it mitigates any or all of the same technical problems as do the present systems and methods.

Features which are described in the context of separate embodiments may also be provided in combination in a single embodiment. Conversely, various features which are, for brevity, described in the context of a single embodiment, may also be provided separately or in any suitable sub-combination. The Applicants hereby give notice that new claims may be formulated to such features and/or combinations of such features during the prosecution of the present Application or of any further Application derived therefrom.

What is claimed is:

1. A method of operating a battery, the method comprising:

circulating a catholyte solution within a cathode compartment of a battery, wherein the battery comprises a cathode current collector within the cathode compartment having manganese dioxide plated thereon, wherein the catholyte solution comprises manganese ions;

circulating an anolyte solution within an anode compartment of the battery, wherein the battery comprises an anode current collector within the anode compartment having zinc plated thereon, wherein the anolyte solution comprises zinc ions, and wherein the catholyte solution and the anolyte solution have different compositions, and wherein the pH of the catholyte solution is less than the pH of the anolyte solution;

preventing direct mixing between the anolyte and the catholyte during the circulating by using a separator disposed between the cathode compartment and the anode compartment; and generating an electrical current from the battery while circulating the catholyte solution and circulating the anolyte solution.

2. The method as recited in claim 1, wherein the catholyte solution has a temperature between 0° C. and 200° C.

3. The method as recited in claim 1, wherein the anolyte solution has a temperature between 0° C. and 200° C.

4. The method as recited in claim 1, further comprising:
dissolving the manganese dioxide from the cathode current collector within the cathode compartment during the generating of the electrical current; and
dissolving the zinc from the anode current collector within the anode compartment during the generating of the electrical current.

5. The method as recited in claim 4, wherein the manganese dioxide is α, β, γ, λ, ε, δ, electrolytic manganese dioxide, pyrolusite, birnessite, ramsdellite, hollandite, romanechite, todorokite, lithiophorite, chalcophanite, sodium or potassium rich birnessite, cryptomelane, buserite, manganese oxide, a spinel form of manganese dioxide.

6. The method as recited in claim 5, wherein the spinel form of manganese dioxide is hausmannite ($Mn_3O_4$), $LiMn_2O_4$, $CuMn_2O_4$, $ZnMn_2O_4$, or combinations thereof.

7. The method as recited in claim 1, further comprising;
ceasing the generating of the electrical current;
applying a voltage between the cathode current collector within the cathode compartment and the anode current collector within the anode compartment;
electroplating the zinc onto the anode current collector in response to applying the voltage; and
electroplating the manganese dioxide onto the cathode current collector in response to applying the voltage.

8. The method as recited in claim 1, wherein generating the electrical current comprises generating an electrical current at a voltage between 0 and 3.5V.

9. The method as recited in claim 1, wherein the generating the electrical current uses between 0-100% of the theoretical capacity of the manganese dioxide.

10. The method as recited in claim 1, wherein the generating the electrical current uses between 0-100% of the theoretical capacity of Zn.

11. The method as recited in claim 1, further comprising: recharging the battery a plurality of times after generating the electrical current.

12. The method as recited in claim 1, wherein the anode current collector, the cathode current collector, or both comprise at least one material comprising: carbon, lead, copper, nickel, bismuth, titanium, magnesium, aluminum, silver, or combinations thereof.

13. The method as recited in claim 12, wherein at least one of the cathode current collector or the anode current collector comprises carbon, and wherein the carbon is graphite, carbon fiber, carbon black, acetylene black, single walled carbon nanotubes, multi-walled carbon nanotubes, graphene, graphyne, graphene oxide, nitrogen-doped carbon, or combinations thereof.

14. The method as recited in claim 12, wherein the anode current collector, the cathode current collector, or both are in the form of a mesh, foil, foam, fibrous, a porous block architecture, an aerogel, or a combination thereof.

15. The method as recited in claim 1, wherein the catholyte solution in the cathode compartment contains a mixed solution comprising at least one of manganese sulfate, manganese chloride, manganese nitrate, manganese perchlorate, manganese acetate, manganese bis(trifluoromethanesulfonate), manganese triflate, manganese carbonate, manganese oxalate, manganese fluorosilicate, manganese ferrocyanide, manganese bromide, nitric acid, sulfuric acid, hydrochloric acid, sodium sulfate, potassium sulfate, sodium hydroxide, potassium hydroxide, potassium permanganate, titanium sulfate, titanium chloride, lithium nitrate, lithium chloride, lithium bromide, lithium bicarbonate, lithium acetate, lithium sulfate, lithium permanganate, lithium nitrate, lithium nitrite, lithium hydroxide, lithium perchlorate, lithium oxalate, lithium fluoride, lithium carbonate, lithium bromate, or any combination thereof.

16. The method as recited in claim 1, wherein the anolyte solution in the anode compartment is a mixed solution comprising at least one of zinc sulfate, zinc triflate, zinc chloride, zinc acetate, zinc carbonate, zinc chlorate, zinc fluoride, zinc formate, zinc nitrate, zinc oxalate, zinc sulfite, zinc tartrate, zinc cyanide, zinc oxide, sodium hydroxide, potassium hydroxide, lithium hydroxide, potassium chloride, sodium chloride, potassium fluoride, lithium nitrate, lithium chloride, lithium bromide, lithium bicarbonate, lithium acetate, lithium sulfate, lithium permanganate, lithium nitrate, lithium nitrite, lithium perchlorate, lithium oxalate, lithium fluoride, lithium carbonate, lithium bromate or combinations thereof.

17. The method as recited in claim 1, wherein the separator is lithium super ionic conductor (LISICON), sodium super ionic conductions (NASICON), Nafion, a bipolar membrane, water electrolysis membrane, a composite of polyvinyl alcohol and graphene oxide, Celgard, cellophane or combinations thereof.

18. The method as recited in claim 1, further comprising:
circulating the anolyte solution between the anode compartment and an anolyte vessel, wherein the anolyte vessel is external to the anode compartment.

19. The method as recited in claim 1, further comprising:
circulating the catholyte solution between the cathode compartment and a catholyte vessel, wherein the catholyte vessel is external to the cathode compartment.

20. The method as recited in claim 1, wherein the catholyte solution has a pH between 0 and 7.

21. The method as recited in claim 1, wherein the anolyte solution has a pH between 0 and 15.13.

22. The method as recited in claim 1, wherein the anolyte solution is basic, and wherein the catholyte solution is acidic.

* * * * *